United States Patent
Masaki et al.

(10) Patent No.: US 10,491,491 B2
(45) Date of Patent: Nov. 26, 2019

(54) CALCULATION DEVICE, PROGRAM, AND INFORMATION PROCESSING METHOD

(71) Applicant: FUJITSU LIMITED, Kawasaki-shi, Kanagawa (JP)

(72) Inventors: Reiji Masaki, Shimizu (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 373 days.

(21) Appl. No.: 15/355,375

(22) Filed: Nov. 18, 2016

(65) Prior Publication Data

US 2017/0155565 A1 Jun. 1, 2017

(30) Foreign Application Priority Data

Nov. 27, 2015 (JP) ................... 2015-232282

(51) Int. Cl.
*G06F 15/173* (2006.01)
*H04L 12/26* (2006.01)
*H04L 29/08* (2006.01)

(52) U.S. Cl.
CPC .............. *H04L 43/08* (2013.01); *H04L 67/10* (2013.01)

(58) Field of Classification Search
USPC ......... 370/404; 435/6.12; 715/736; 709/203, 709/206, 217, 219, 223, 224, 226, 228, 709/230, 232, 238; 708/206
See application file for complete search history.

(56) References Cited

U.S. PATENT DOCUMENTS

| | | | | |
|---|---|---|---|---|
| 9,847,913 B2 * | 12/2017 | Kanda | ................. | H04L 41/0896 |
| 10,185,624 B2 * | 1/2019 | Akutsu | ................. | G06F 3/0619 |
| 2005/0030961 A1 * | 2/2005 | Lee | ................. | H04L 12/4637 370/404 |
| 2007/0220164 A1 | 9/2007 | Inagaki et al. | | |
| 2012/0009581 A1 * | 1/2012 | Bankaitis-Davis | ................. | C12Q 1/6886 435/6.12 |
| 2012/0158808 A1 * | 6/2012 | Yang | ................. | G01D 21/00 708/206 |
| 2014/0095696 A1 * | 4/2014 | Sala | ................. | G06F 11/3409 709/224 |

(Continued)

FOREIGN PATENT DOCUMENTS

| | | |
|---|---|---|
| JP | 2007-249810 | 9/2007 |
| JP | 2015-165198 | 9/2015 |

OTHER PUBLICATIONS

Office Action dated May 28, 2019 in corresponding Japanese Patent Application No. 2015-232282.

*Primary Examiner* — Quang N Nguyen
(74) *Attorney, Agent, or Firm* — Staas & Halsey LLP

(57) ABSTRACT

An information processing method for a computer having a memory and a processor coupled to the memory, and the computer is coupled between a plurality of transmission nodes and a reception node. The method including: calculating coefficients of an equation, the coefficients corresponding to a number of transmission nodes having an abnormality among a plurality of transmission nodes, based on a numeric value including state information of transmission nodes having the abnormality and identification information for identifying the transmission nodes having the abnormality; and transmitting the coefficients to a reception node that extracts the numeric value from a solution of the equation using the coefficients.

12 Claims, 7 Drawing Sheets

(56) References Cited

U.S. PATENT DOCUMENTS

2016/0124616 A1\* 5/2016 Ahn ................. G06T 11/206
715/736
2017/0228274 A1\* 8/2017 Guccione ............. H04L 41/145

\* cited by examiner

FIG. 2

|  | ABNORMAL | NORMAL |
|---|---|---|
| PARAMETER 201 | 1 | 0 |
| ARGUMENT 202 | ERROR CODE + IDENTIFICATION INFORMATION | 0 |
| ARGUMENT 203 | ERROR CODE + IDENTIFICATION INFORMATION | 1 |

200

|  | ARGUMENT 202 | ARGUMENT 203 |
|---|---|---|
| NODE 110a | 0 | 1 |
| NODE 110b | 0 | 1 |
| ... | ... | ... |
| NODE 110XX | p | p |
| ... | ... | ... |
| NODE 110YY | q | q |
| ... | ... | ... |
| NODE 110n | 0 | 1 |

| | ABNORMAL | NORMAL |
|---|---|---|
| PARAMETER 201 | 1 | 0 |
| ARGUMENT 302 | ERROR CODE + IDENTIFICATION INFORMATION | 1 |

300

| | TRANSMISSION DATA1 | TRANSMISSION DATA2 | TRANSMISSION DATA3 |
|---|---|---|---|
| NODE 110a | 1 | 1 | 1 |
| NODE 110b | 1 | 1 | 1 |
| ... | ... | ... | ... |
| NODE 110XX | p+d | p+e | p+f |
| ... | ... | ... | ... |
| NODE 110YY | q+d | q+e | q+f |
| ... | ... | ... | ... |
| NODE 110ZZ | r+d | r+e | r+f |
| ... | ... | ... | ... |
| NODE 110n | 1 | 1 | 1 |

310

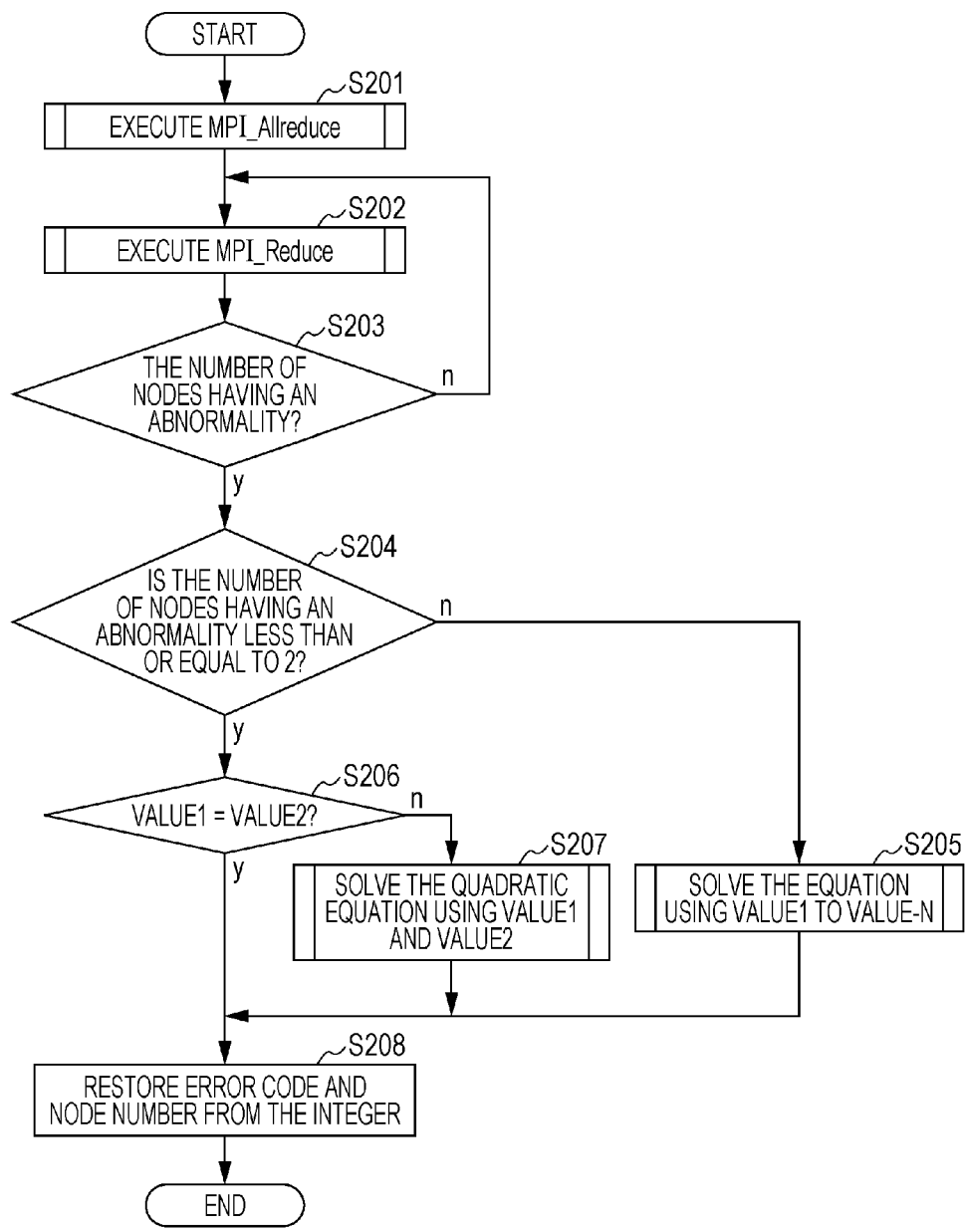

CALCULATION DEVICE, PROGRAM, AND INFORMATION PROCESSING METHOD

CROSS-REFERENCE TO RELATED APPLICATION

This application is based upon and claims the benefit of priority of the prior Japanese Patent Application No. 2015-232282, filed on Nov. 27, 2015, the entire contents of which are incorporated herein by reference.

FIELD

The embodiments discussed herein are related to an information collection system that collects information from a plurality of nodes.

BACKGROUND

A distributed system is provided with a plurality of transmission nodes and a reception node for managing the plurality of transmission nodes. The reception node that realizes information intensive communication collects the state information of a plurality of transmission nodes at regular intervals in order to manage the states of the plurality of transmission nodes. The reception node receives the state information from the plurality of transmission nodes at regular intervals so as to detect a transmission node in which an abnormality has occurred.

A technique for increasing the speed of data transfer processing is known. Each node that constitutes a parallel computer first transfers data divided by n to the other nodes, and each node aggregates each 1/n data and performs calculation. Next, a plurality of nodes transfers the individual calculation results to an aggregation node. Since all the nodes individually perform calculation of the divided data, it is possible to realize the transfer processing at a high speed (for example, refer to Japanese Laid-open Patent Publication No. 2007-249810).

A reception node in a distributed system collects state information of a plurality of transmission nodes at regular intervals in order to manage the states of the plurality of transmission nodes. If the state information is received all at once, the amount of communication data increases in accordance with the number of multiple transmission nodes, and thus the communication time increases.

According to an embodiment of the present disclosure, it is desirable to reduce the amount of communication data in an information intensive communication in a distributed system.

SUMMARY

According to an aspect of the invention, an information processing method for a computer is coupled between a plurality of transmission nodes and a reception node. The method includes: calculating coefficients of an equation, the coefficients corresponding to a number of transmission nodes having an abnormality among a plurality of transmission nodes, based on a numeric value including state information of transmission nodes having the abnormality and identification information for identifying the transmission nodes having the abnormality; and transmitting the coefficients to a reception node that extracts the numeric value from a solution of the equation using the coefficients.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory diagram of an example of a distributed system when the number of transmission nodes having an abnormality is less than or equal to two;

FIG. 3 is an explanatory diagram of an example of a distributed system when the number of transmission nodes having an abnormality is equal to or more than three;

FIG. 7 is a flowchart illustrating an example of processing in a reception node.

DESCRIPTION OF EMBODIMENTS

A calculation device according to the present disclosure makes it possible to reduce the amount of communication data of the state information transmitted from each transmission node using a relationship between the reduction operation and the coefficients of the roots of a predetermined equation.

Figure 1:
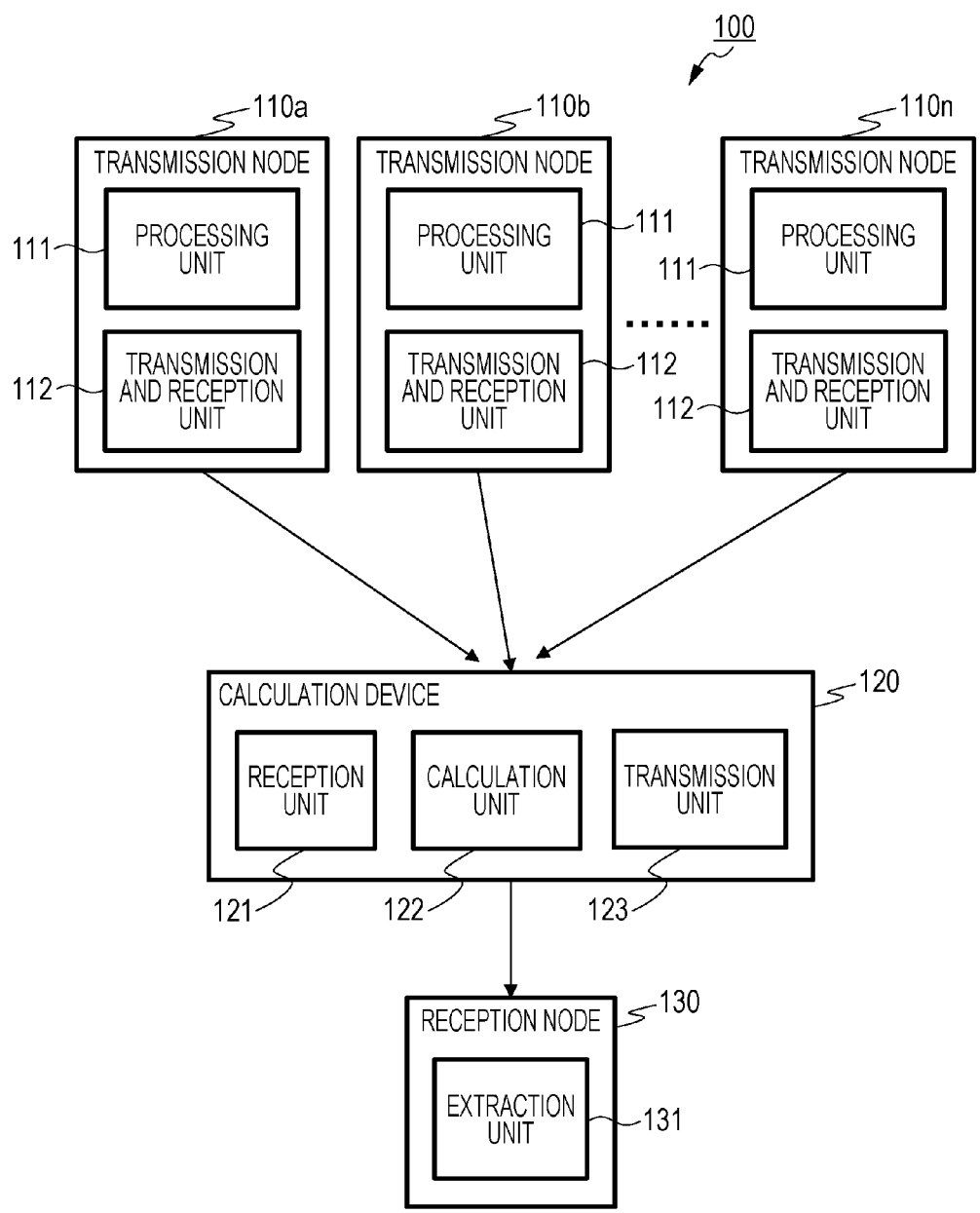
FIG. 1 is an explanatory diagram of an example of a distributed system according to the present embodiment.

FIG. 1 is an explanatory diagram of an example of a distributed system according to the present embodiment. A distributed system 100 includes a plurality of transmission nodes 110a to 110n, a calculation device 120, and a reception node 130. The reception node 130 collects the state information from the plurality of transmission nodes 110a to 110n in order to manage the plurality of transmission nodes 110a to 110n. Each of the plurality of transmission nodes 110a to 110n includes a processing unit 111 and a transmission and reception unit 112. The calculation device 120 includes a reception unit 121, a calculation unit 122, and a transmission unit 123. The reception node 130 includes an extraction unit 131.

The processing unit 111 first determines whether there is an abnormality in the own transmission node 110. After that, the transmission and reception unit 112 shares the information of whether there are abnormalities among the transmission nodes 110a to 110n. The processing unit 111 converts a pair of the identification information for identifying the own transmission node 110 and the state information into an integer (the argument used for reduction). The transmission and reception unit 112 transmits the integer and an operation instruction using the integer to the calculation device 120.

The reception unit 121 of the calculation device 120 receives the integer and the operation instruction from each of the transmission nodes 110 (110a to 110n). The calculation unit 122 of the calculation device 120 performs the reduction processing (operation) using a method of calculating the coefficients of an "equation" using the received integer (argument). The coefficients calculated as a result of the reduction processing have a smaller amount of data than the integer, which is the pair of the identification information and the state information. The transmission unit 123 of the calculation device 120 transmits the calculated coefficients to the reception node 130.

The extraction unit 131 of the reception node 130 solves the "equation" from the received coefficients, and extracts an integer, which is a pair of the identification information and the state information.

The coefficients that are transmitted from the calculation device 120 to the reception node 130 have a smaller amount of data than the integer that is a pair of the identification information and the state information. Thus, it is possible for the calculation device 120 to reduce the amount of communication data to be transmitted to the reception node 130.

When the number of transmission nodes having an abnormality is less than or equal to two FIG. 2 is an explanatory diagram of an example of a distributed system when the number of transmission nodes having an abnormality is less than or equal to two. The parameter 201 is used for sharing information of whether or not there is an abnormality among the transmission nodes 110a to 110n. The parameter 201 is also notified to the reception node 130. Each of the plurality of transmission nodes 110a to 110n transmits the argument 202 and the argument 203 to the calculation device 120. The table 200 illustrates an example of the parameter 201, the argument 202, and the argument 203 in the case where there is an abnormality in the plurality of transmission nodes 110a to 110n and in the case where there are no abnormalities.

The parameter 201 is used for each of the transmission nodes 110 to count the number of transmission nodes 110 (any one of 110a to 110n) having an abnormality. The processing unit 111 of one of the transmission nodes 110 (any one of 110a to 110n) having an abnormality sets the parameter 201 to "1", which indicates that there is an abnormality. Transmission nodes 110a to 110n having no abnormalities set the parameter 201 to "0", which indicates that there are no abnormalities.

Here, the transmission and reception units 112 of the transmission nodes 110 (110a to 110n) share the parameter 201 among the nodes. If the number of transmission nodes 110 having an abnormality is less than or equal to two, the processing units 111 of the transmission nodes 110 (110a to 110n) generate the argument 202 and the argument 203.

The argument 202 is an argument that is used at the time of calculating (adding) coefficients of the calculation device 120. The processing units 111 of the transmission nodes 110 having no abnormalities set the argument 202 to "0", which indicates that there are no abnormalities. The processing units 111 of the transmission nodes 110 (any one of 110a to 110n) having an abnormality set information including a pair of the error code (state information) and the identification information that identifies the transmission node having an abnormality in the argument 202.

The argument 203 is an argument that is used at the time of calculating (multiplying) coefficients of the calculation device 120. The processing unit 111 of the transmission node 110 having no abnormalities set the argument 203 to "1", which indicates that there are no abnormalities. The processing unit 111 of the transmission nodes 110 (any one of 110a to 110n) having an abnormality sets information including a pair of the error code (state information) and the identification information that identifies the transmission node having an abnormality in the argument in the argument 203.

The number of transmission nodes having an abnormality is less than or equal to two, and thus each of the transmission units 112 of the transmission nodes 110 transmits the argument 202, the argument 203, and an operation instruction using these arguments to the calculation device 120.

Upon receiving the argument 202 and the argument 203, the calculation device 120 performs the reduction processing using a method of calculating the coefficients of the "equation". A description will be given of an example of the reduction processing in sequence.

It is assumed that one transmission node 110XX has an abnormality among transmission nodes 110 (110a to 110n). If the number of transmission nodes 110 having an abnormality is one, the calculation unit 122 of the calculation device 120 determines that redundant integers, each of which indicates the error code and the identification information of the transmission node 110XX having an abnormality to be two coefficients. In this regard, a two-digit suffix, XX, is added, but this does not necessarily mean to have nodes for two digits or more than ten (that is to say, 00 to 99). This is the same in the following description.

It is assumed that both the transmission node 110XX and the transmission node 110YY have an abnormality among the transmission nodes 110 (110a to 110n). The calculation unit 122 of the calculation device 120 sets an integer indicating the error code and the identification information of the transmission node 110XX having an abnormality in "α". The calculation unit 122 sets an integer indicating the error code and the identification information of the transmission node 110YY in "β".

The calculation unit 122 calculates coefficients V(1) and V(2) from α and β that are set based on the argument 202 and the argument 203 using Expression 1 and Expression 2 given below.

$$V(1)=\alpha+\beta \quad\quad\quad \text{Expression 1}$$

$$V(2)=\alpha\times\beta \quad\quad\quad \text{Expression 2}$$

The transmission unit 123 of the calculation device 120 transmits the coefficient V(1) and the coefficient (V2) to the reception node 130.

The extraction unit 131 of the reception node 130 solves a quadratic equation of $x^2+V(1)x+V(2)$ based on the received coefficients V(1) and V(2) so as to make it possible to extract α and β. Each of α and β includes an error code and the identification information of each of the transmission nodes 110. Accordingly, the extraction unit 131 extracts α and β so that the reception node 130 identifies a transmission node 110 having an abnormality, and thus enables acquisition of the error code.

The table 210 is an example of the argument 202 and the argument 203 that are transmitted by the plurality of transmission nodes 110a to 110n. In this regard, the transmission node 110XX and the transmission node 110YY are two nodes having an abnormality. Accordingly, the calculation device 120 receives arguments in which the argument 202 is set to 0 and the argument 203 is set to 1 from the transmission nodes other than the transmission node 110XX and the transmission node 110YY.

In the example in the table 210, the reception unit 121 of the calculation device 120 receives the argument 202 and the argument 203 that are set to p from the transmission node 110XX having an abnormality. The reception unit 121 of the calculation device 120 receives the argument 202 and the argument 203 that are set to q from the transmission node 110YY having an abnormality. In this regard, here it is assumed that α=p and β=q.

The calculation unit 122 calculates the coefficients V(1) and V(2) from p and q that are set in the argument 202 and the argument 203 using Expression 1 and Expression 2. The transmission unit 123 of the calculation device 120 transmits the coefficients V(1) and V(2) to the reception node 130.

The extraction unit 131 of the reception node 130 solves the quadratic equation of $x^2+V(1)x+V(2)$ based on the received coefficients V(1) and V(2) so as to make it possible to extract p and q. Specifically, an Expression 3 ought to be calculated.

$$x^2+V(1)x+V(2)=x^2+(p+q)x+(p*q)=(X+p)(X+q) \quad \text{Expression 3}$$

By obtaining a solution of this quadratic equation so that the extraction unit 131 of the reception node 130 makes it possible to extract p and q, which is a pair of the error code and the identification information.

The coefficients that are transmitted from the calculation device 120 to the reception node 130 have a smaller amount of data than the integers, each of which is a pair of the identification information and the state information. That is to say, if compared with the amount of data of the case where the state information of all the transmission nodes are individually transmitted, the amount of data becomes small because only the coefficients are transmitted. Accordingly, it is possible for the calculation device 120 to reduce the amount of communication data that is transmitted to the reception node 130.

When the number of transmission nodes having an abnormality is equal to or more than three FIG. 3 is an explanatory diagram of an example of a distributed system when the number of transmission nodes having an abnormality is equal to or more than three. The parameter 201 is used for sharing the information as to whether there is an abnormality among the transmission nodes 110a to 110n. The parameter 201 is also notified to the reception node 130. If the number of transmission nodes having an abnormality is equal to or more than three, each of the plurality of transmission nodes 110a to 110n transmits transmission data (multiple pieces) produced by adding a fixed value to the argument 302 to the calculation device 120. A table 300 is an example of the parameter 201 and the argument 302 in the case of "there is an abnormality" and in the case of "there are no abnormalities" in the plurality of transmission nodes 110a to 110n.

The parameter 201 is used for counting the number (assuming that the number of nodes having an abnormality is k) of transmission nodes 110 (any one of 110a to 110n) having an abnormality by each of the transmission nodes 110. The processing units 111 of the transmission nodes 110 (any one of 110a to 110n) having an abnormality set the parameter 201 to "1", which indicates that there is an abnormality. The transmission nodes 110a to 110n having no abnormalities set the parameter 201 to "0", which indicates that there are no abnormalities.

Here, the transmission and reception units 112 of the transmission nodes 110 (110a to 110n) share the parameter 201 among the nodes. If the number of transmission nodes having an abnormality is equal to or more than three, the processing units 111 of the transmission nodes 110 (110a to 110n) generate transmission data (multiple pieces) produced by adding a fixed value to the argument 302.

The argument 302 is an argument used at the time of calculating a coefficient (multiplication) of the calculation device 120. The processing units 111 of the transmission node 110 having no abnormalities set the argument 302 to "1", which indicates that there are no abnormalities. The processing units 111 of the transmission nodes 110 (any one of 110a to 110n) having an abnormality set k kinds of arguments 302 that are produced by adding k different fixed values (0 to (k−1)) to the information (integer) of the pair of the error code (state information) and identification information that identifies the transmission node having an abnormality.

Each of the transmission and reception units 112 of the transmission node (any one of 110a to 110n) having an abnormality transmits k kinds of arguments 302 (transmission data) to the calculation device 120. Further, each of the processing units 111 selects any j nodes from k transmission nodes having an abnormality. The number j is a number that is less than or equal to k. Each of the transmission and reception units 112 transmits an instruction to calculate coefficients to be used for a j-th degree equation to the calculation device 120.

A table 310 is an example of transmission data (a sum value of a fixed value and the argument 302) that is transmitted from the plurality of transmission nodes 110a to 110n to the calculation device 120 in the case where k and j are set to three. Here, three nodes (k nodes), that is to say, the transmission node 110XX, the transmission node 110YY, and the transmission node 110ZZ are nodes that have an abnormality. Accordingly, the calculation device 120 receives arguments 302 that are set to 1 from the transmission nodes other than the transmission node 110XX, the transmission node 110YY, and the transmission node ZZ.

The transmission node 110XX, the transmission node 110YY, and the transmission node ZZ transmit three kinds of transmission data produced by adding different fixed values d, e, and f to the information of a pair of the error code and the identification information to the calculation device 120. The number of fixed values corresponds to the number of transmission nodes having an abnormality.

Specifically, the calculation device 120 receives "p+d", "p+e", and "p+f", which are the sums of the argument 302 and d, e, or f respectively, from the transmission node 110XX having an abnormality. A reference symbol p is an integer that indicates a pair of the error code and the identification information of the transmission node 110XX. The calculation device 120 receives "q+d", "q+e", and "q+f", which are the sums of the argument 302 and d, e, or f respectively, from the transmission node 110YY having an abnormality. A reference symbol q is an integer that indicates a pair of the error code and the identification information of the transmission node 110YY. The calculation device 120 receives "r+d", "r+e", and "r+f", which are the sums of the argument 302 and d, e, or f respectively, from the transmission node 110ZZ. A reference symbol r is an integer that indicates a pair of the error code and the identification information of the transmission node 110ZZ.

When the processing unit 122 of the calculation device 120 receives the arguments of the reduction processing from the transmission node having an abnormality, the processing unit 122 of the calculation device 120 calculates coefficients V(1), V(2), and V(3) using Expression 4 to Expression 6. In this example, j is selected to be three, and thus the processing unit 122 selects three coefficients.

$$V(1)=(p+d)*(q+d)*(r+d) \quad \text{Expression 4}$$

$$V(2)=(p+e)*(q+e)*(r+e) \quad \text{Expression 5}$$

$$V(3)=(p+f)*(q+f)*(r+f) \quad \text{Expression 6}$$

After that, the transmission unit 123 transmits the calculated coefficients to the reception node 130.

The extraction unit 131 of the reception node 130 extracts p, q, and r based on the received coefficients V(1) to V(3).

For example, if it is assumed that P(d)=V(1), P(e)=V(2), and P(f)=V(3), it is possible to replace Expression 4 to Expression 6 with Expression 7.

$$P(x) = (x+p)*(x+q)*(x+r) \quad \text{Expression 7}$$
$$= x^3 + (p+q+r)x^2 + (pq+qr+rp)x + p*q*r$$
$$= x^3 + Ax^2 + Bx + C$$

where in Expression 7, p+q+r is A, pq+qr+rp is B, and p*q*r is C. Here, if d, e, and f are assigned to x in Expression 7, Expression 8 to Expression 10 are obtained.

$$P(d) = d^3 + Ad^2 + Bd + C = V(1) \quad \text{Expression 8}$$

$$P(e) = e^3 + Ae^2 + Be + C = V(2) \quad \text{Expression 9}$$

$$P(f) = f^3 + Af^2 + Bf + C = V(3) \quad \text{Expression 10}$$

Next, solve simultaneous equations with three unknowns using A to C in Expression 8 to Expression 10 as unknowns. If the fixed value terms in Expression 8 to Expression 10 are transposed to the right side, Expression 11 to Expression 13 are obtained respectively.

$$Ad^2 + Bd + C = V(1) - d^3 \quad \text{Expression 11}$$

$$Ae^2 + Be + C = V(2) - e^3 \quad \text{Expression 12}$$

$$Af^2 + Bf + C = V(3) - f^3 \quad \text{Expression 13}$$

Assuming that Expression 11 to Expression 13 are matrix vectors, Expression 14 and Expression 15 are obtained.

$$(A, B, C) \begin{bmatrix} d^2 & e^2 & f^2 \\ d & e & f \\ 1 & 1 & 1 \end{bmatrix} = \quad \text{Expression 14}$$
$$((V(1)-d^3), (V(2)-e^3), (V(3)-f^3))$$

$$\begin{bmatrix} d^2 & d & 1 \\ e^2 & e & 1 \\ f^2 & f & 1 \end{bmatrix} \begin{bmatrix} A \\ B \\ C \end{bmatrix} = \begin{bmatrix} V(1)-d^3 \\ V(2)-e^3 \\ V(3)-f^3 \end{bmatrix} \quad \text{Expression 15}$$

Here, d, e, and f are all different so that it is known that the determinant is not 0 from the basic properties of a determinant. The basic properties of a matrix is that if the product of a fixed value and the other column is added to one column, the value is unchanged, and if one column is multiplied by a fixed value, the value is also multiplied by the fixed value.

$$\begin{bmatrix} d^2 & e^2 & f^2 \\ d & e & f \\ 1 & 1 & 1 \end{bmatrix} = \begin{bmatrix} d^2 - e^2 & e^2 & f^2 \\ d-e & e & f \\ 0 & 1 & 1 \end{bmatrix} \quad \text{Expression 16}$$
$$= (d-e) \times \begin{bmatrix} d+e & e^2 & f^2 \\ 1 & e & f \\ 0 & 1 & 1 \end{bmatrix}$$
$$= (d-e) \times (e-f) \times \begin{bmatrix} d+e & e+f & f^2 \\ 1 & 1 & f \\ 0 & 0 & 1 \end{bmatrix}$$
$$= (d-e) \times (e-f) \times \begin{bmatrix} d-f & e+f & f^2 \\ 0 & 1 & f \\ 0 & 0 & 1 \end{bmatrix}$$
$$= (d-e) \times (e-f) \times (d-f) \times \begin{bmatrix} 1 & e+f & f^2 \\ 0 & 1 & f \\ 0 & 0 & 1 \end{bmatrix}$$
$$= (d-e) \times (e-f) \times (d-f)$$

When P(x) obtained in this way is set to 0, (−p), (−q), and (−r) are obtained as roots. It is therefore possible for the extraction unit 131 of the reception node 130 to extract p, q, and r.

In this regard, if j is less than or equal to 4, it is possible to solve a j-th degree equation by the root formula. If j is equal to or more than 5, it is possible to solve numerically.

The coefficients transmitted from the calculation device 120 to the reception node 130 have a smaller amount of data than the integer, which is a pair of the identification information and the state information. Accordingly, in a distributed system, it is possible to reduce the amount of communication data between the calculation device 120 and the reception node 130.

Figure 4:
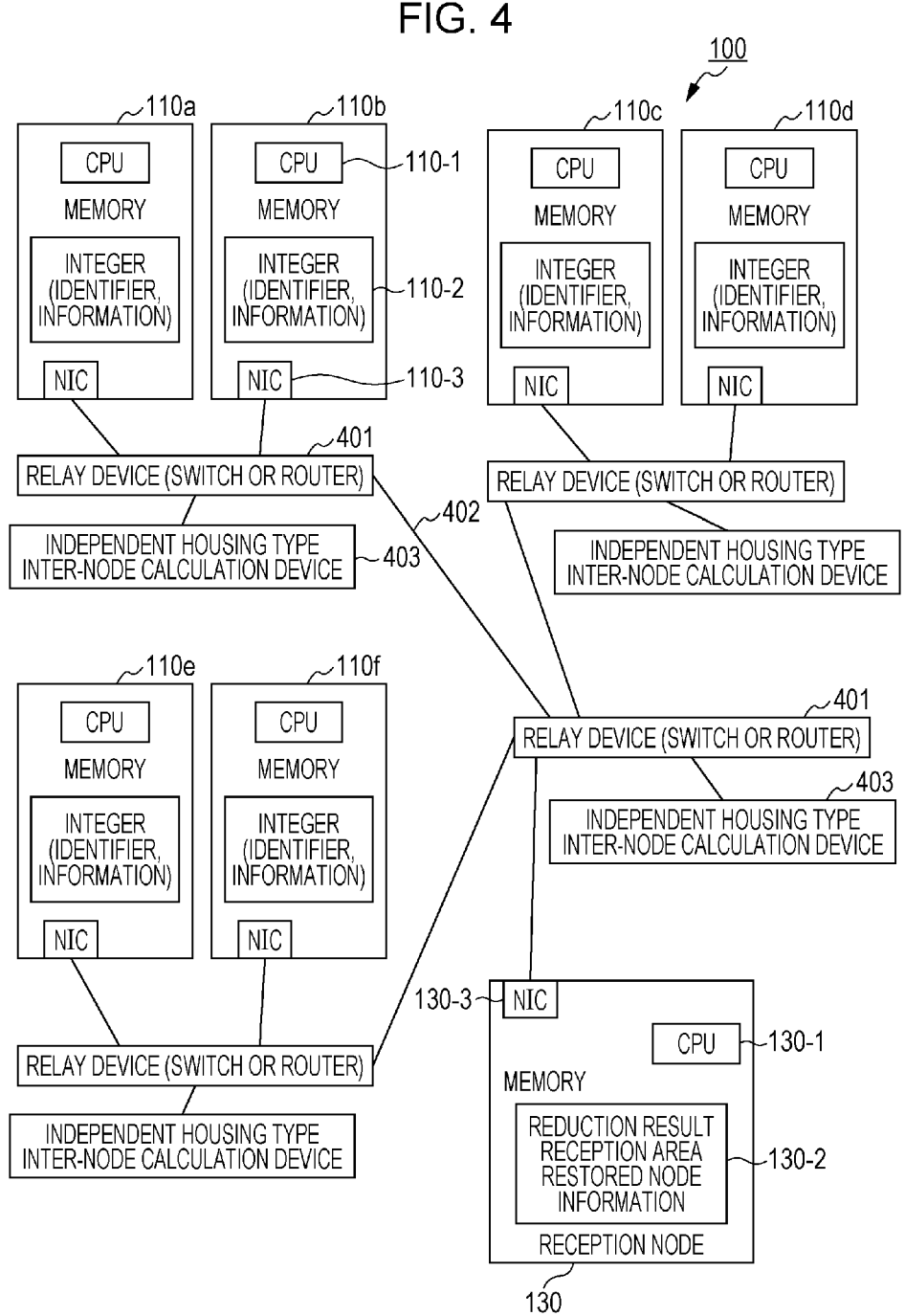
FIG. 4 is an explanatory diagram of an example a configuration of a distributed system.

FIG. 4 is an explanatory diagram of an example of a configuration of a distributed system. In the distributed system 100, the transmission nodes 110a to 110f and the reception node 130 are mutually coupled by a relay device 401, which is a switch or a router, and a network including a communication line 402. Further, in the distributed system 100, an independent housing type inter-node calculation device 403 having a reduction function is coupled to the relay device 401 other than a node.

In this regard, FIG. 4 is an example of a distributed system 100. Any number of transmission nodes 110 (110a to 110n), relay devices 401, and independent housing type inter-node calculation devices 403 may be included in this system. The transmission nodes 110 (110a to 110n) include a central processing unit (CPU) 110-1, a memory 110-2, and a network interface card (NIC) 110-3, which is a network interface. The memory 110-2 stores the identification information and the state information of each transmission node 110. Also, the reception node 130 includes a CPU 130-1, a memory 130-2, and a NIC 130-3. The memory 130-2 stores the coefficients of the received reduction result, and the state information and the identification information that are extracted from the coefficients.

In this embodiment, the reduction processing is realized not by the CPUs 110-1 of the transmission nodes 110, nor by the CPU 130-1 of the reception node 130, but using the inter-node calculation devices 403 having such as atomic operations, network reduction functions, or the like.

The reduction function realized by the inter-node calculation device 403 refers to the processing defined by an API in the name of MPI Reduce in the Message Passing Interface (MPI) standard, for example. The reduction function also refers to reduction to one piece of data having the same type as that before operation by the repetition of a binary operation that specifies individual data. For example, if a specified binary operation is addition, the corresponding reduction result becomes the sum total of the data of all the nodes. In the MPI standard, macros that specify a multiplication, a bitwise OR, "a pair of the maximum value and a place", or the like is defined in addition to addition as an operation that is allowed to be specified in the reduction by MPI Reduce.

The performance of the above-described reduction in the environment of the distributed system 100 is determined by the communication time among nodes, and the time taken for the operation becomes negligible. However, with an increase in the system size, the reduction might become processing with multiple stages of relay operations having input information among all the nodes.

The substantial portion of the communication time among the nodes is an access overhead of the network device to the main storage device, that is to say, the time during which the data passes via an input output (IO) bus, and a CPU time for controlling the IO processing and performing operations. In order to perform an operation in a CPU, first, operation target data stored in a memory has to be fetched to the CPU, and the calculation result has to be stored in the memory again. Further, if a reduction operation is performed in the CPU while a plurality of stages of the relay processing is performed on a network, data passes via the IO bus and the memory bus two times for each stage of the relay. In contrast, if an operation is performed inside the network device having operation functions among the nodes, the overhead for the data to pass via the IO bus and the memory bus is reduced, and the reduction performance is improved significantly.

Figure 5:
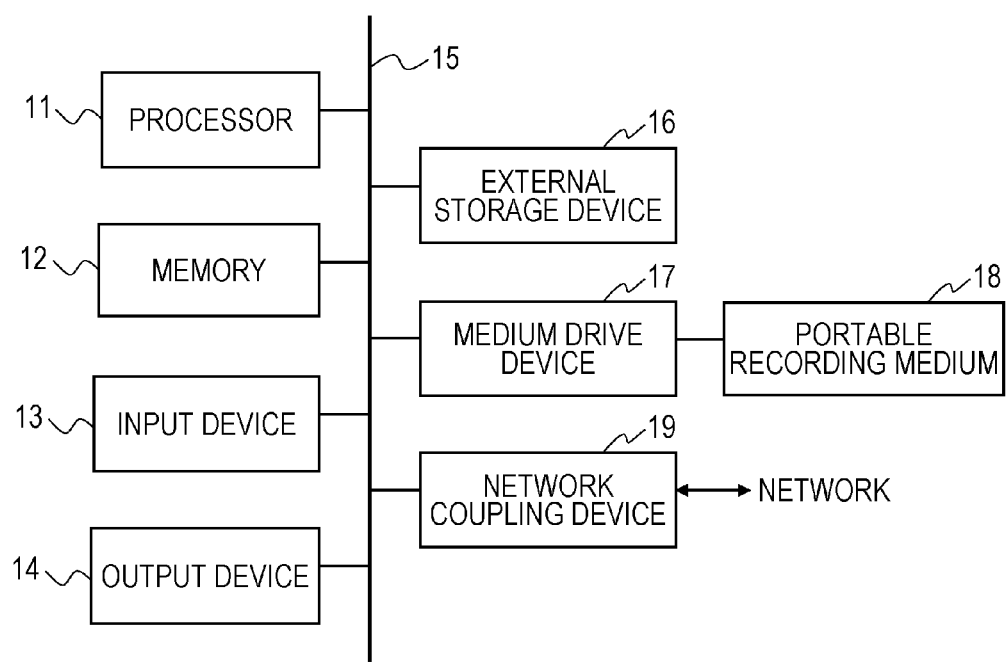
FIG. 5 is an explanatory diagram of an example of a hardware configuration of various devices installed in the distributed system.

FIG. 5 is an explanatory diagram of an example of a hardware configuration of various devices installed in a distributed system. The transmission nodes 110 and the reception node 130 include a processor 11, a memory 12, a bus 15, an external storage device 16, and a network coupling device 19. Further, as options, the transmission nodes 110 and the reception node 130 may include an input device 13, an output device 14, and a medium drive device 17. The transmission nodes 110 and the reception node 130 are sometimes realized by a computer, or the like, for example.

It is possible to realize the processor 11 by any processing circuit including a CPU. The processor 11 in the transmission node 110 is the CPU 110-1 in FIG. 4, and operates as the processing unit 111 in FIG. 1. The processor 11 in the reception node 130 is the CPU 130-1 in FIG. 4, and operates as the extraction unit 131 in FIG. 1. In this regard, it is possible for the processor 11 to execute the program stored in the external storage device 16, for example.

The memory 12 in the transmission node 110 is the memory 110-2. The memory 12 in the reception node 130 is the memory 130-2. Further, the memory 12 suitably stores the data obtained by the operation of the processor 11 and the data to be used for the processing by the processor 11.

The network coupling device 19 in the transmission node 110 is the NIC 110-3 in FIG. 4, and operates as the transmission and reception units 112 in FIG. 1. The network coupling device 19 in the reception node 130 is the NIC 130-3 in FIG. 4. The network coupling device 19 is used for the communication with the other devices and operates for that purpose. The input device 13 is realized as a button, a keyboard, a mouse, or the like, for example. The output device 14 is realized as a display, or the like. The bus 15 couples the processor 11, the memory 12, the input device 13, the output device 14, the external storage device 16, the medium drive device 17, the network coupling device 19 so as to enable data to be mutually transferred among the devices. The external storage device 16 stores programs, data, or the like, and suitably provides the stored information to the processor 11, or the like. The medium drive device 17 is capable of outputting the data in the memory 12 and in the external storage device 16 to the portable storage medium 18, and also is capable of reading data, programs, or the like from the portable storage medium 18. Here, it is possible to realize the portable storage medium 18 by any portable storage medium including a floppy disk, a magnet-optical (MO) disc, compact disc recordable (CD-R), or a digital versatile disc recordable (DVD-R).

Here, a description will be given of an example of a hardware configuration of the inter-node calculation device 403. The inter-node calculation device 403 includes a processor 11, a memory 12, and a network coupling device 19. The processor 11 operates as the calculation unit 122. The memory 12 suitably stores the data obtained by the operation of the processor 11 and the data to be used for the processing by the processor 11. The network coupling device 19 operates as the reception unit 121 and the transmission unit 122, and is used for the communication with the other devices and operates for that purpose.

Figure 6:
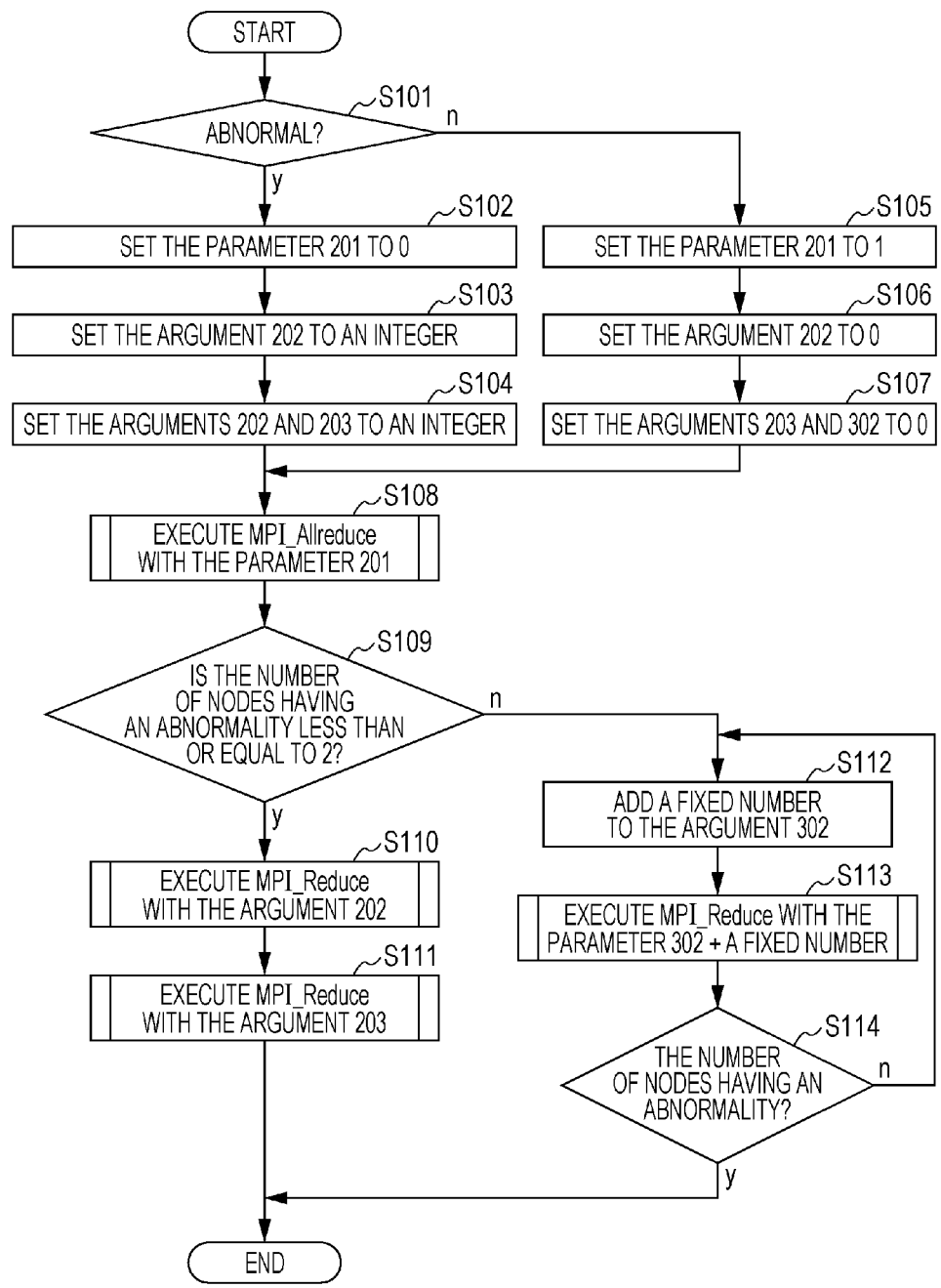
FIG. 6 is a flowchart illustrating an example of processing in a transmission node.

FIG. 6 is a flowchart illustrating an example of processing in the transmission node. The processing unit 111 of the transmission node 110 determines whether or not the own transmission node 110 has an abnormality (step S101). If the transmission node 110 has an abnormality (YES in step S101), the processing unit 111 sets the parameter 201 to 0 (step S102). The processing unit 111 sets the argument 202 to an integer with which the error code and the identification information of the own transmission node 110 are associated (step S103). The processing unit 111 sets the argument 203 and the argument 302 to an integer with which the error code and the identification information of the own transmission node 110 are associated (step S104).

On the other hand, if the transmission node 110 does not have an abnormality (NO in step S101), the processing unit 111 sets the parameter 201 to 1 (step S105). The processing unit 111 sets the argument 202 to 0 (step S106). The processing unit 111 sets the argument 203 and the argument 302 to 0 (step S107).

The transmission and reception unit 112 transmits the parameter 201 to all the transmission nodes with MPI_Allreduce, which is an API command, and also receives the parameters 201 of the other transmission nodes 110 (step S108). The processing unit 111 determines whether or not the number of transmission nodes 110 having an abnormality is less than or equal to two based on the parameters 201 (step S109).

If the number of transmission nodes 110 having an abnormality is less than or equal to two (YES in step S109), the processing unit 111 executes MPI_Reduce using the argument 202 (step S110). By the processing in step S110, the argument 202 is transmitted to the calculation device 120. The calculation device 120 performs the reduction processing by the addition (Expression 1), and transmits the coefficients of the calculation result to the reception node 130. Next, the processing unit 111 executes MPI_Reduce using the argument 203 (step S111). By the processing in step S111, the argument 203 is transmitted to the calculation device 120. The calculation device 120 performs the reduction processing by the multiplication (Expression 2), and transmits the coefficients of the calculation result to the reception node 130. When step S111 is completed, the processing unit 111 terminates the processing to notify of an abnormality.

If the number of transmission nodes 110 having an abnormality is three or more (NO in step S109), the processing unit 111 adds a fixed value to the argument 302 (step S112). The processing unit 111 executes MPI_Reduce using a value produce by adding a fixed value to the argument 302 (step S113). The value produced by adding the fixed value to the argument 302 in the processing in step S113 is transmitted to the calculation device 120. The calculation device 120 performs the reduction processing with the multiplication (Expression 4 to 6, or the like), and transmits the coefficients of the calculation result to the reception node 130. The processing unit 111 determines whether or not the processing from step S112 to step S113 has been performed for the number of transmission nodes having an abnormality (step S114). If the processing has not been performed for the number of transmission nodes having an abnormality (NO in step S114), the processing unit 111 repeats the processing from step S112. Note that the fixed value to be added are changed as d, e or f, for each time the processing is repeated. When the processing for the number of transmission nodes having an abnormality has been performed (YES in step S114), the processing unit 111 terminates the processing that notifies of an abnormality.

FIG. 7 is a flowchart illustrating an example of the processing in the reception node. The extraction unit 131 transmits the parameter 201 to all the transmission nodes with MPI_Allreduce, which is an API command, and also receives the parameters 201 of the other transmission nodes 110 (step S201). Thereby, it is possible for the extraction unit 131 to know the number of abnormal nodes. The extraction unit 131 executes MPI_Reduce, and obtains the reduction result by the multiplication using the integers (step S202). The extraction unit 131 determines whether or not the integers (coefficients) for the number of transmission nodes 110 having an abnormality have been obtained (step S203). If the integers (coefficients) for the number of transmission nodes 110 having an abnormality have not been obtained (NO in step S203), the extraction unit 131 repeats the processing from step S202.

If the integers (coefficients) for the number of transmission nodes 110 having an abnormality have been obtained (YES in step S203), the extraction unit 131 determines whether or not the number of transmission nodes having an abnormality is less than or equal to two (step S204). If the number of transmission nodes having an abnormality is not less than or equal to two (NO in step S204), the extraction unit 131 extracts integers indicating pairs of the error code and the identification information from the solution of the equation using the coefficient values (N values) (step S205).

If the number of transmission nodes having an abnormality is less than or equal to two (YES in step S204), the extraction unit 131 determines whether or not a coefficient value1 and a coefficient value2 are the same value (step S206). If the coefficient value1 and the coefficient value2 are not the same value (NO in step S206), the extraction unit 131 determines that the number of transmission nodes having an abnormality is two, and extracts the integers indicating the error code and the identification information from the solution of the quadratic equation using the coefficient value 1 and the coefficient value 2 (step S207). If the coefficient value1 and the coefficient value2 are the same value (YES in step S206), when step S205 and step 207 are completed, the extraction unit 131 extracts the error code and the identification information from the integers (step S208).

In this regard, if the coefficient value1 and the coefficient value2 are the same value (YES in step S206), this is the case where there is one transmission node having an abnormality. Accordingly, the coefficient value 1 and coefficient value 2 are the error code and the identification information by themselves.

The coefficients transmitted from the calculation device 120 to the reception node 130 have a smaller amount of data than the integers, each of which is a pair of the identification information and the state information. Accordingly, in a distributed system, it is possible to reduce the amount of communication data between the calculation device 120 and the reception node 130.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A calculation device to be coupled between a plurality of transmission nodes and a reception node in a distributed processing system, the calculation device comprising:
a memory, and
a processor coupled to the memory and configured to execute a process, the process comprising:
calculating coefficients of an equation, the coefficients corresponding to a number of transmission nodes having an abnormality among a plurality of transmission nodes, based on a numeric value including state information of the transmission nodes having the abnormality and identification information for identifying the transmission nodes having the abnormality; and
transmitting the coefficients to the reception node,
wherein the reception node extracts the numeric value from a solution of the equation using the coefficients and controls the distributed processing system based on the numeric value.

2. The calculation device according to claim 1, in the transmitting, when the number of transmission nodes having the abnormality is one, the numeric value including the state information of the transmission node having the abnormality and the identification information for identifying the transmission node having the abnormality is transmitted to the reception node as the coefficient.

3. The calculation device according to claim 1, in the calculating, when the number of transmission nodes having the abnormality is two, the coefficients of a quadratic equation are calculated based on two numeric values each including the state information and the identification information of the respective transmission nodes having the abnormality.

4. The calculation device according to claim 1, in the calculating, when the number of transmission nodes having the abnormality is three or more, the coefficients of the equation are calculated based on a sum value of the numeric value including the state information and the identification information of the respective transmission nodes having the abnormality and a fixed value in accordance with the number of transmission nodes having the abnormality.

5. A non-transitory and computer-readable medium storing a program for causing a calculation device to execute processing comprising:
calculating coefficients of an equation, the coefficients corresponding to abnormal transmission nodes, each having an abnormality among a plurality of transmission nodes in a distributed processing system, based on a numeric value including state information of the abnormal transmission nodes and identification information for identifying the abnormal transmission nodes;

transmitting the coefficients to a reception node, wherein the reception node extracts the numeric value from a solution of the equation using the coefficients and controls the distributed processing system based on the numeric value.

6. The non-transitory and computer-readable medium according to claim 5, wherein, when a number of transmission nodes having the abnormality is one, the program causes the calculation device to execute processing including transmitting the numeric value including the state information of the transmission nodes having the abnormality and the identification information for identifying the transmission nodes having the abnormality to the reception node as the coefficient.

7. The non-transitory and computer-readable medium according to claim 5, wherein, when a number of transmission nodes having the abnormality is two, the program causes the calculation device to perform processing including calculating the coefficients of a quadratic equation based on two numeric values each including the state information and the identification information of the respective transmission nodes having the abnormality.

8. The non-transitory and computer-readable medium according to claim 5, wherein, when a number of transmission nodes having the abnormality is three or more, the program causes the calculation device to perform calculating the coefficients of the equation based on a sum value of the numeric value including the state information and the identification information of the respective transmission nodes having the abnormality and a fixed value in accordance with the number of transmission nodes having the abnormality.

9. An information processing method for a computer having a memory and a processor coupled to the memory, the method comprising:

calculating coefficients of an equation, the coefficients corresponding to abnormal transmission nodes, each having an abnormality among a plurality of transmission nodes in a distributed processing system, based on a numeric value including state information of the abnormal transmission nodes and identification information for identifying the abnormal transmission nodes; and transmitting the coefficients to a reception node, wherein the reception node extracts the numeric value from a solution of the equation using the coefficients and controls the distributed processing system based on the numeric value.

10. The information processing method according to claim 9, wherein if a number of transmission nodes having the abnormality is one, transmitting the numeric value including the state information of the transmission nodes having the abnormality and the identification information for identifying the transmission nodes having the abnormality to the reception node as the coefficient.

11. The information processing method according to claim 9, wherein if a number of transmission nodes having the abnormality is two, calculating the coefficients of a quadratic equation based on two numeric values including the state information and the identification information of the respective transmission nodes having the abnormality.

12. The information processing method according to claim 9, wherein if a number of transmission nodes having the abnormality is three or more, calculating the coefficients of the equation based on a sum value of the numeric value including the state information and the identification information of the respective transmission nodes having the abnormality and a fixed value in accordance with the number of transmission nodes having the abnormality.

* * * * *